No. 623,372. Patented Apr. 18, 1899.
C. A. HUSSEY.
VEHICLE WHEEL.
(Application filed July 3, 1897.)
(No Model.)
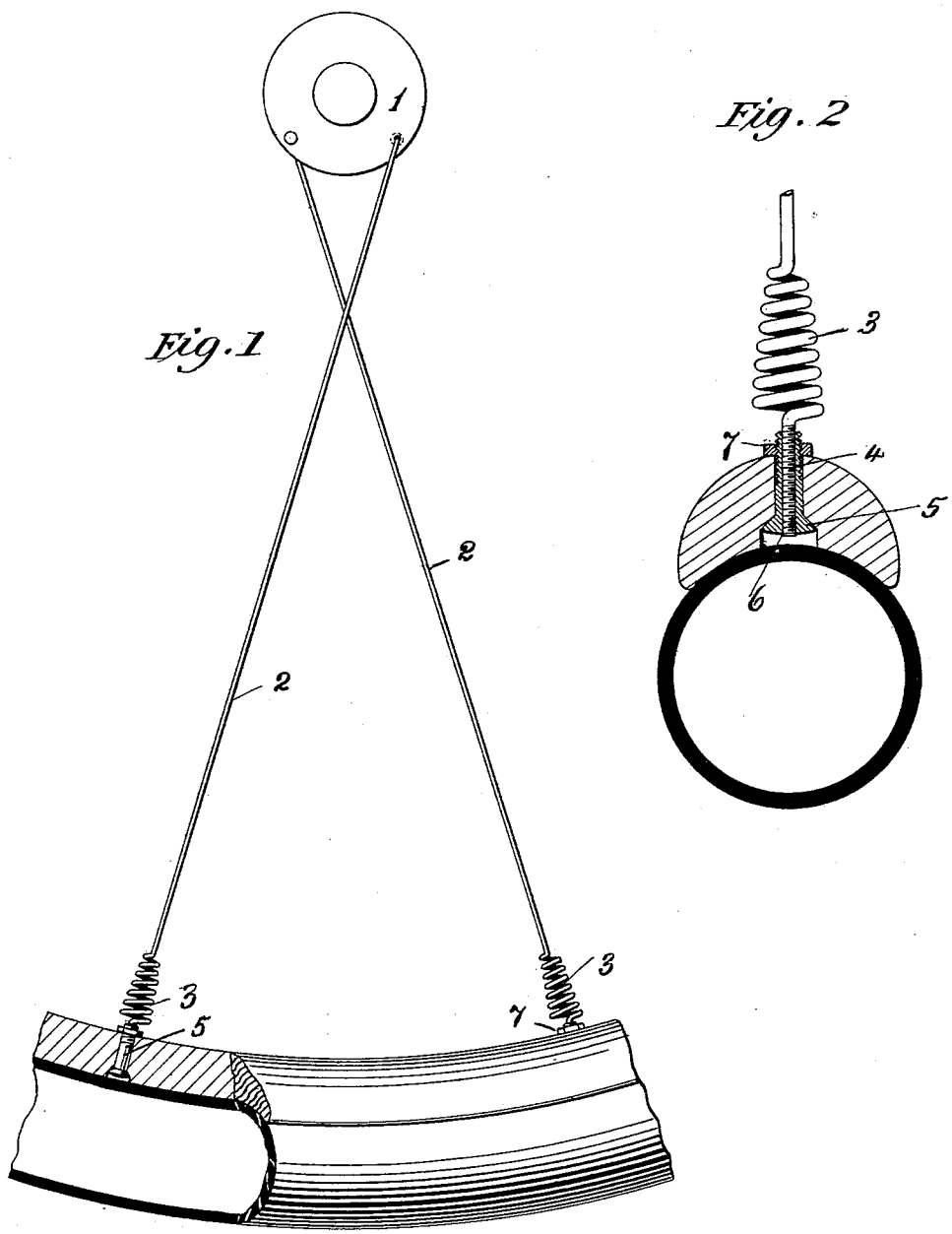

UNITED STATES PATENT OFFICE.

CHARLES A. HUSSEY, OF NEW YORK, N. Y., ASSIGNOR TO PAUL GOEPEL, TRUSTEE, OF SAME PLACE.

VEHICLE-WHEEL.

SPECIFICATION forming part of Letters Patent No. 623,372, dated April 18, 1899.

Application filed July 3, 1897. Serial No. 643,323. (No model.)

*To all whom it may concern:*

Be it known that I, CHARLES A. HUSSEY, residing in the city of New York, in the county and State of New York, have invented a new and useful Improvement in Vehicle-Wheels, of which the following is a specification.

In the construction of bicycles and similar vehicles at the present day the vibrations of the frame due to the irregularities in the surface traversed are taken up only by a comparatively slight resiliency of the pneumatic tire and the springs of the seat, where such springs are used. These only very ineffectually take up the vibrations, and a bicycle as at present constructed is practically as rigid and unyielding as a springless vehicle.

The present invention relates to devices for providing a yielding resilient connection between a wheel-hub and its rim.

In the present illustration of the invention it consists in providing a spring along the length of the spokes intermediate of the rim and hub, such spring either being made integral with the spoke itself or consisting of an independent part.

In the drawings I have illustrated a construction embodying my invention, in which—

Figure 1 is a view in side elevation, showing a portion of a wheel provided with spokes made according to my invention. Fig. 2 is an enlarged detail view, partly in cross-section.

Like numerals of reference refer to like parts throughout both views of the drawings.

Referring to the drawings more particularly, 1 designates the hub of the wheel, to which are attached in any desired manner the spokes 2. Each of these spokes consists of a straight portion of steel wire, which near its connection with the rim is coiled into a helical spring 3, which is normally under tension when the spoke is secured in position and is provided with a screw-threaded end section 4. A small bolt 5 passes through the rim and is provided with a central screw-threaded tapped hole 6, into which the end section 4 screws, the bolt 5 being tightly secured in place by a nut 7. The connection of the spoke with the rim by means of the end section 4 socketing in the hollow bolt 5 gives a connection between the rim and the spokes rigid against lateral strains in all directions, while the spring affords all the desired vertical resiliency.

Of course other forms of springs than that shown may be availed of, as any form of spring intermediate of the rim and the hub would come within the spirit of the invention.

What is claimed as new is—

1. A wheel consisting of a rim, a hub, a series of spokes connecting the rim with the hub, springs intermediate the spokes and rim and forming part of the spokes, and means combined with said parts for drawing out and holding said springs under tension, substantially as described.

2. A wheel consisting of a rim, a hub, a series of spokes connecting the rim with the hub, a spring provided in each of the spokes and forming a part thereof, and means comprising a bolt passing through the rim and working on the end of the spoke for holding the spring under tension, and a nut working on said bolt adapted to bear against the rim for holding the bolt from movement in the rim and thereby holding the spring under tension, substantially as described.

In testimony whereof I have signed my name to this specification in the presence of two subscribing witnesses.

CHARLES A. HUSSEY.

Witnesses:
CAROLINE E. DAVIDSON,
WILLIAM A. POLLOCK.